E. RIMAILHO.
ENDLESS TRACK FOR FACILITATING THE PROGRESSION OF AUTOMOBILE VEHICLES ON HILLY GROUND.
APPLICATION FILED AUG. 8, 1918.
1,358,575.
Patented Nov. 9, 1920.
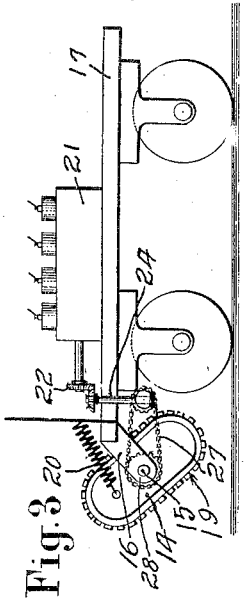
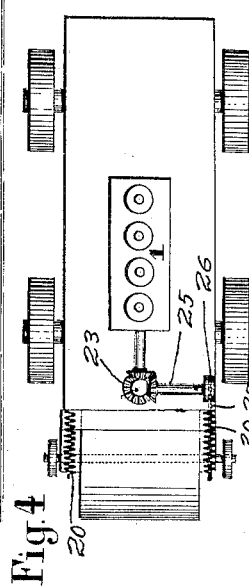
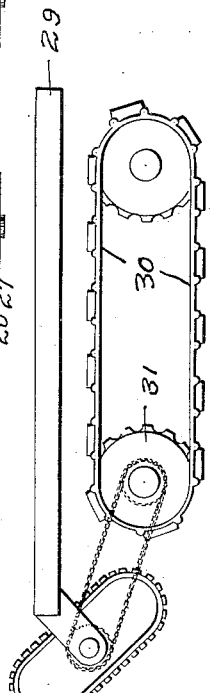
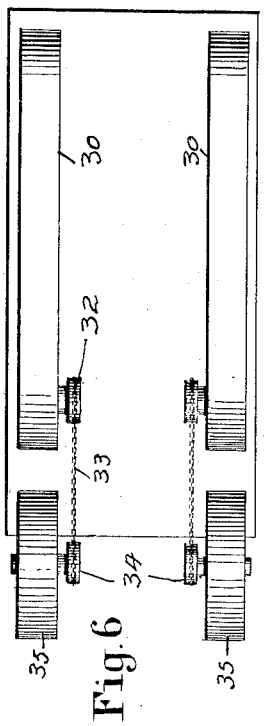
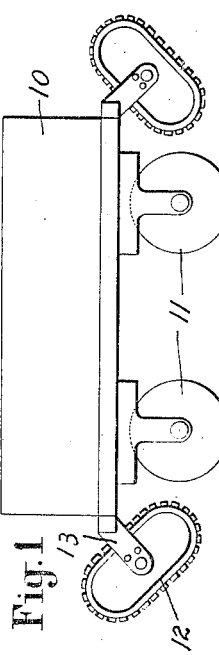
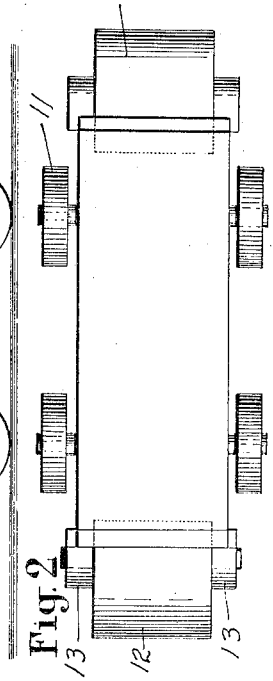
INVENTOR
Emile Rimailho
BY
ATTORNEYS

UNITED STATES PATENT OFFICE.

EMILE RIMAILHO, OF PARIS, FRANCE, ASSIGNOR TO COMPAGNIE DES FORGES ET ACIERIES DE LA MARINE ET D'HOMECOURT, OF PARIS, FRANCE.

ENDLESS TRACK FOR FACILITATING THE PROGRESSION OF AUTOMOBILE VEHICLES ON HILLY GROUNDS.

1,358,575.     Specification of Letters Patent.     Patented Nov. 9, 1920.

Application filed August 8, 1918. Serial No. 249,003.

*To all whom it may concern:*

Be it known that I, EMILE RIMAILHO, a citizen of the French Republic, and residing in Paris, France, 12 Rue de la Rochefoucauld, consulting engineer, have invented certain new and useful Improvements in Endless Tracks for Facilitating the Progression of Automobile Vehicles on Hilly Grounds, of which the following is a complete specification.

The present invention relates to an endless track-shoe for connection with self propelled vehicles, of the heavy type, to facilitate their travel upon uneven or hilly ground.

In the accompanying drawings forming a part of this specification and in which like numerals are employed to designate like parts throughout the same, Figure 1 is a side elevation of a vehicle having my endless track-shoe applied thereto, Fig. 2 is a plan view of the same, Fig. 3 is a side elevation of a slightly different form of endless track-shoe embodying the invention, Fig. 4 is a plan view of the same, Fig. 5 is a side elevation of the third different form of the invention, and Fig. 6 is a plan view of the same.

Attention being called first to Figs. 1 and 2 the numeral 10 designates a vehicle of a heavy type, supported by broad wheels 11.

The numeral 12 designates shoes of the usual endless tread type. These endless track-shoes are angularly arranged near the opposite ends of the vehicle and extend upwardly in a forwardly direction. These endless track-shoes are arranged between and secured to arms 13, in turn rigidly attached to the vehicle 10. The endless track-shoes have a substantial width.

In Figs. 3 and 4 an endless track-shoe 14 is provided, similar to the shoe 12, and this shoe is freely pivoted upon a transverse shaft 15, journaled through openings in arms 16, rigidly secured to the vehicle 17, supported by wheels 18. The shaft 15 serves to drive the endless tread portion 19 of the endless track shoe.

The endless track-shoe 14 is free to swing about the shaft 15 as an axis, and the upper end of the shoe is moved inwardly by retractile coiled springs 20, whereby its lower end is moved toward the ground.

A prime mover 21, such as an internal combustion engine, is arranged upon the vehicle 17, and drives a gear 22, in turn driving a horizontal gear 23, carried by a vertical shaft 24. This vertical shaft is suitably geared at its lower end to a horizontal shaft 25, driving a sprocket wheel 26, engaged by a sprocket chain 27. The sprocket chain 27 extends forwardly to engage and drive the sprocket wheel 28, secured to the shaft 15 to rotate it. It is thus seen that the endless tread portion 19 of the shoe 14 is positively geared to the engine 21 to be driven thereby.

In Figs. 5 and 6, the vehicle 29 is propelled by main endless tracks 30, embodying wheels 31. The forward wheels 31 are equipped with sprocket wheels 32, engaged by sprocket chains 33, extending forwardly to engage the sprocket wheels 34. The sprocket wheels 34 drive the endless tread portions of shoes 35, which are angularly arranged at the end of the vehicle 29, and connected therewith.

In the operation of the devices, it is obvious that when the vehicle encounters a hill the endless track-shoe will engage therewith and assist the vehicle in passing over the same. When the shoe is positively driven it also serves as propelling means for the vehicle. The endless track-shoe in Figs. 3 and 4 is selfadjusting, as it is free to swing upon the shaft 15.

Having thus described my invention, I claim:

1. The combination with a wheeled vehicle, of downwardly inclined spaced arms secured to an end of the vehicle, and a shoe pivoted in said arms and having an endless track portion and mounted approximately at its center of length in said arms and resilient means to cause said shoe to extend upwardly in a forwardly direction.

2. The combination with a wheeled vehicle, of an inclined shoe arranged at one end thereof and extending upwardly in a forwardly direction, said shoe embodying an endless tread portion, means pivotally connecting the shoe with the vehicle so that the shoe is permanently free to swing in a vertical plane longitudinally of the vehicle, yielding means connected with the upper portion of the shoe to swing it rearwardly toward the vehicle, and means carried by the vehicle to positively drive the endless tread portion of the shoe.

3. The combination with a wheeled vehicle, of a support at the end of a vehicle, a shaft mounted in the support, a shoe pivotally mounted at about its center of length on the shaft and having an endless tread portion operated by the shaft, a spring secured to the shoe and vehicle, a motor on the vehicle, and means for operating the said shaft from the motor.

In testimony whereof I have hereunto set my hand at Saint-Etienne (France) this twenty-fourth day of June, 1918.

EMILE RIMAILHO. [L. S.]

In the presence of—
ERNEST DELPUY,
PIERRE PEYRIEUX.